Oct. 12, 1937.   D. W. EVERETT   2,095,598

VALVE OILING SYSTEM

Filed May 28, 1934

INVENTOR
David W. Everett
BY
Philip A. [Niedels]
ATTORNEY

Patented Oct. 12, 1937

2,095,598

UNITED STATES PATENT OFFICE 2,095,598

VALVE OILING SYSTEM

David W. Everett, San Francisco, Calif.

Application May 28, 1934, Serial No. 727,937

8 Claims. (Cl. 123—196)

This invention is a valve oiling system for internal combustion motors, insuring the proper and efficient lubrication of the valves under all conditions and speeds of operation.

Valve oiling systems have been introduced in various forms, some being controlled by the throttle lever, some by the vacuum created in the manifold, and others by special hand adjustments. Those operated by vacuum have not anticipated a supply of oil maintained at constant level with negative pressure head, but are intended for operation with varying levels and positive pressure heads, so far as known. In addition, no suitable means for properly controlling the feed of oil under varying vacuum conditions has previously been advanced, consequently the oil is fed too fast under high vacuum conditions and too slow under low vacuum conditions.

This invention provides for exacting and efficient delivery of oil under all vacuum conditions and positive control is assured, the system being entirely automatic in its action and controlled by the variation in vacuum conditions.

The main object of the invention therefore, is to provide a valve oiling system which is entirely automatic in operation, and which is controlled by the vacuum created in the manifold.

Another object of the invention is to provide a system as outlined with a supply of oil having constant level below the point of communication with the intake manifold, therefore operating under a negative pressure head, whereby oil can only be delivered to the manifold through the medium of the vacuum created therein, thereby preventing leakage or loss.

A further object of the invention is to provide means for insuring delivery of oil under low vacuum conditions by making the total vacuum available for lifting or pumping the oil when the vacuum is low and for gradually increasing the pressure differential as the vacuum in the manifold is increased.

A still further object of the invention is to provide a vacuum actuated valve which is restrained in its closing movement as the vacuum in the manifold is increased above a predetermined value.

Other objects and advantages of the invention will become apparent as the following description is read on the drawing forming a part of this specification, and in which similar reference characters are used to designate similar parts throughout the several views, of which:

Figure 1:
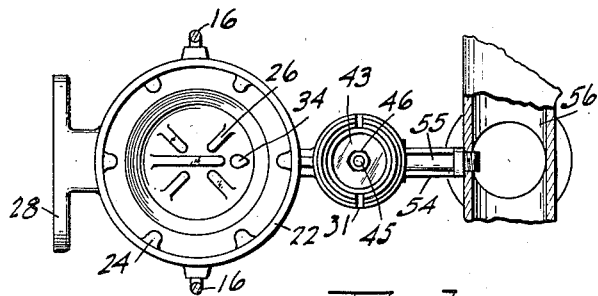
Fig. 1 is a plan view of the invention with the container removed.
Figure 3:
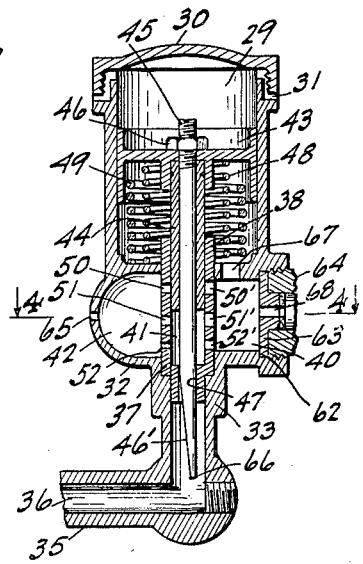
Fig. 3 is an enlarged sectional elevation of the control head.
Figure 2:
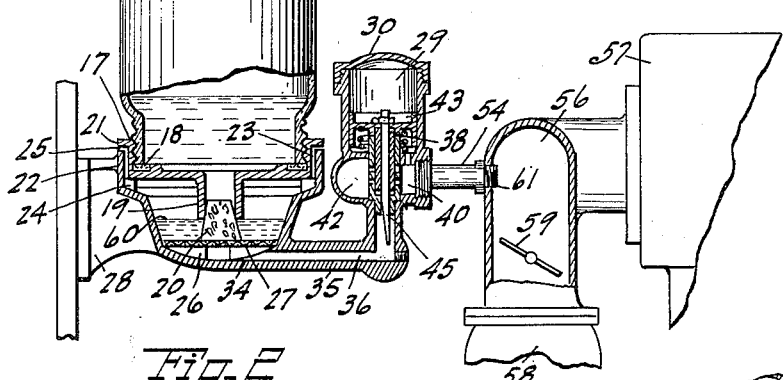
Fig. 2 is a side elevation of the invention shown partly in section.
Figure 4:
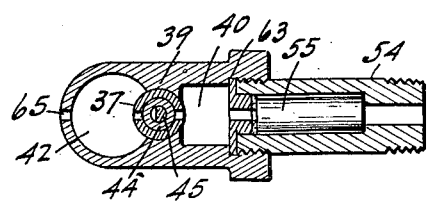
Fig. 4 is a section taken on line 4—4 of Fig. 3.
Figure 5:
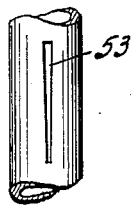
Fig. 5 is a modification of the vacuum control tube.

The invention consists of a container for oil, an oil chamber, and a control head together with a source of vacuum, such as an intake manifold of an internal combustion motor, a supply of oil in the container, and a supply of oil in the oil chamber maintained by the supply in the container at constant level.

The container consists preferably of a glass or other transparent jar 10, to the bottom 11 of which is fixed, as by adhesive or other adhesive substance 12, a cam block 13 having a cam surface 14 and a bail retaining recess 15 in which a resilient securing bail 16 engages for securing the jar in position, the bottom 11 of the jar forming the top of the container, since the container is used in inverted form.

A special screw top 17 fits on the standard thread of the jar and has a cork or other resilient annular insert 18 imbedded therein for sealing the cap to the mouth of the jar, and it also has a discharge spout 19 projecting downwardly and which is formed to receive a standard cork or other sealing device for shipping or delivery purposes. An annular flange 21 is formed at the top of the cap to shed dirt and moisture. The cork 20 is removed for operation.

The oil chamber has an annular encompassing wall 22 in which the cap 17 fits, and air passages 23 vent the inside of the oil chamber when the cap and container are mounted in place, and the caps rest on lugs 24 for the purpose of maintaining a vent space 25 between the top of the chamber wall 22 and the flange 21 to permit ingress of air through the passages 23.

The bottom of the chamber is provided with a plurality of filter rests 26 for supporting the filter 27, and a mounting bracket 28 is formed integrally with the oil chamber. The filters are replaceable by merely removing the jar with its cap.

The control head includes a vacuum actuated valve and associated pressure differential controlling means, which increases the pressure differential in the respective vacuum chambers as the vacuum in the manifold is increased.

The control head consists of a cylinder 29 having a vented cap 30, the vent being shown at 31, a vacuum section 32 and a valve section 33, this valve section being in communication with the bottom of the oil chamber as indicated at 34 through a conduit 35 having a passage 36 formed therein.

The valve chamber is formed by a tube 37, which is fixedly secured in the valve section 33, this tube extending upwardly into the cylinder as shown at 38, and coincidently completes the formation of a wall 39 dividing the vacuum section into a first vacuum chamber 40, a second or intermediate vacuum chamber 41 within the tube and a third or compensating vacuum chamber 42, this tube being counterbored as shown, the bore forming the port through which the oil is pumped or drawn and in which the valve operates to restrict the delivery of oil.

Slidable within the cylinder 29 is a piston 43 having a plain tubular piston rod 44 which is slidable in the tube 37 and which is of such length as to practically touch the bottom of the counterbore when the piston is in its lowest position.

Adjustably secured in the piston and fitting within the tube 44 is a valve rod 45 having means 48 for locking the rod in its adjusted position, the lower end of the rod being elongately beveled as indicated at 46' and terminating just above the bottom of the counterbore when the rod is in its lowest position, so that it does not quite completely seal the port under the highest vacuum conditions created in the manifold, and also whereby the passage for oil is gradually restricted as the rod is urged downwardly through the bore 47 by increasing vacuum conditions, the rod being slidably fitted in the bore.

The piston 43 is normally retained in its uppermost position by a light spring 48 for retracting the valve rod almost entirely from the bore, and a second, or restraining spring 49 cooperates with the piston only when the piston reaches a predetermined point in its downward travel, the open length of this spring being less than the distance from the spring seat to the web of the piston when the piston is in its highest position. This second spring forms restraining means for restraining the closing movement of the valve when predetermined high vacuum conditions are created in the manifold.

The tube 38 is provided with a series of through apertures in diametral alignment, the apertures 50, 51 and 52 in one wall being of less area than the apertures 50', 51' and 52' through the other wall, these apertures being successively sealed by the tube 44 as the piston is drawn downwardly through the medium of the vacuum created in the manifold. Instead of these apertures, an elongated slit 53, preferably downwardly converging as shown, may be formed through the walls of the tube, these apertures or slits forming communication between the three vacuum chambers 40, 41 and 42.

A connection 54 is provided with a sight glass 55 and communicates between the first vacuum chamber 40 and the intake manifold 56 of an internal combustion motor 57 at a point above the carburetor 58 and throttle valve 59, the oil level 60 in the oil chamber being below the point of connection 61 with the intake manifold, the oil therefore being under negative pressure head as related to the point of communication with the intake manifold. A seat 62 is formed in the chamber against which a washer 63 seats, and the threaded portion 64 of the connection 54 is screwed against this washer to retain the washer in position, the washer forming a thrust member for the sight glass and having a passage of slightly greater area than the combined area of the three apertures 50, 51, and 52.

The operation of the device is as follows:

The container 10 is filled with oil and inverted with its cap fitting within the oil chamber, (the cork 20 being removed). The securing bail 16 is urged into position over the cam surface 14 to its locking position in the recess 15.

The container maintains the oil level in the oil chamber to a constant level 60, as is done in other well known devices such as poultry water fountains, and air admitted through the vents 23 permit the breaking of the vacuum in the container for the purpose specified.

Since the level 60 is below the point of communication 61 in the intake manifold, the oil is under a negative pressure head as related to that point. Oil fills the passage 36 to the same level as 60. A vacuum is required to deliver the oil to the manifold.

The piston 43 is normally retained by spring 48 in its uppermost position, tube 44 being retracted and permitting communication through the apertures 50, 50', 51, 51', 52, and 52', or through slits 53, between the first and third vacuum chambers 40 and 42. Coincidently, valve rod 45 has only its tip 66 extending into the bore 47. The spring 49 is not engaging the piston.

A vacuum gradually built up in the intake manifold acting through the port 68 to the first vacuum chamber and thence through port 67 to the cylinder creates a pressure differential on the opposite sides of the piston to depress the piston against the action of spring 48, and the vacuum in the first chamber is coincidently transmitted through the apertures 50', 51', and 52' to the second vacuum chamber, and thence through the apertures 50, 51, and 52 to the chamber 42, but little pressure differential being created since the area of port 65 is considerably less than the combined area of either set of apertures 50 to 52 or 50' to 52'.

Under these conditions, the slight vacuum in the manifold is almost entirely available for lifting the oil and the valve is fully open, the oil being converted into a spray or mist by the travel of air through the passage 52—52' from the port 65.

As the piston is further retracted by increased vacuum, the tube 44 seals the passages 50—50' or the upper portion of slit 53, and as the area of the port 65 and the ports 51 and 52 have become nearly equalized, a considerable pressure differential is created between the chambers 40 and 42 and the effective vacuum acting on the oil is an intermediate of this differential, therefore, although the vacuum in the manifold has greatly increased, only a moderate increase has been obtained for lifting the oil, and in addition, the valve has restricted the oil passage.

Upon further increase of vacuum the piston is restrained by the spring 49, ports 50—50' and 51—51' next being sealed by the tube, and as the area of port 65 is greater than the area of port 52, substantially no vacuum exists in chamber 42 and a very high pressure differential exists between chambers 40 and 42, and an intermediate pressure exists in the valve chamber while the valve is further closed or restricted.

Thus it will be seen that the control head controls the delivery of oil by restriction of the oil passage and the creation of a pressure differential which increases with increase of vacuum in the manifold, that the control means is vacuum actuated, that the oil pressure head is negative as related to the point of communication with the manifold, and that the pressure differential is accentuated coincident with increase of vacuum and coincidently with restriction of the valve.

It will be understood that this system, while lubricating the valves, also lubricates the upper portion of the cylinder and piston, and the entire combustion space.

It will also be understood that the highest vacuum is created in the manifold when the throttle is closed and the vehicle in which the motor is installed is coasting against compression, and that at such time but little oil is required for the valves, and the decrease in delivery of oil is accomplished by successively stepping down the vacuum or creating a pressure differential in the series of manifold, first vacuum chamber, second vacuum or valve chamber, and third vacuum chamber, while simultaneously automatically adjusting the valve, thus governing the oil pumping vacuum by creation of pressure differential.

It will be noted that this valve structure is an outstanding improvement over the usual mushroom or similar valve, since to close off a mushroom or needle valve to permit the same flow of fluid, the space between the valve and its seat would be so narrow that a heavy vacuum would be required to break down the oil film, while in this elongately beveled type, a film of oil in the true sense does not exist, there being only a restriction formed at the top edge of the bore and only at one side thereof, and the passage therefore is an aperture and not a crevice as in the case of the other types.

It will be understood that variations in construction and arrangement of parts which are consistent with the appended claims may be resorted to without detracting from the spirit or scope of the invention, or sacrificing any of the advantages thereof.

I claim:

1. In combination with an internal combustion motor having an intake manifold; an oiling system comprising a conduit in communication with said manifold and with an oil supply maintained with constant negative pressure head and in communication with said conduit, and restricting means and pressure differential creating means associated with said conduit and actuated by the vacuum created in the manifold for decreasing the delivery of oil through the conduit to the manifold as the vacuum in the manifold is increased, and means for restraining the restricting means and differential creating means when predetermined high vacuum conditions are created.

2. In combination, an intake manifold having a passage in communication with an oil supply, a valve in the passage, vacuum actuated restricting means for the valve and means associated with the restricting means for increasing the pressure differential between the valve and the manifold as the opening of the valve is decreased, and cooperatively related means for restraining the restricting means when predetermined high vacuum conditions are created in the manifold.

3. In combination with an intake manifold, an oil chamber, an inverted container in communication therewith and mounted to maintain constant level in the oil chamber, an oil passage communicating between the oil chamber and the intake manifold in a plane above the level of the oil, a restricting valve normally retained in open position in said passage, vacuum actuated means for closing said valve in proportion to the existent degree of vacuum in the manifold, and means associated with the vacuum actuated means for controlling the vacuum acting on the oil for accentuating the pressure differential with increase of vacuum in the manifold, and means associated with the vacuum actuated means for restraining the closing of the valve when predetermined high vacuum conditions are created in the manifold.

4. In combination vacuum actuated controlling means controlling the delivery of oil to an intake manifold in varying proportion as related to existing vacuum conditions in the manifold and including means coincidently restricting delivery of oil and increasing the pressure differential with increase of vacuum in the manifold, and restraining means associated with the controlling means restraining the closing of the valve, and effective only when predetermined high vacuum conditions are created in the manifold.

5. An oiling system comprising a source of vacuum, an oil chamber having a supply of oil therein maintained at constant level, a vacuum chamber, a valve chamber formed within said vacuum chamber and communicating with said oil chamber, a vacuum actuated valve in said valve chamber, and associated means operating coincidently therewith and controlling the vacuum created in the vacuum chamber which in turn controls the vacuum in the valve chamber, thereby creating an increasing pressure differential between the source of vacuum and the valve chamber with increase of vacuum at the source for operation of the valve.

6. In combination, an intake manifold and a first vacuum chamber in direct communication therewith, a second vacuum chamber in communication with the first vacuum chamber and with a supply of oil under negative pressure head and constant level, and a third vacuum chamber in communication with the first vacuum chamber through the second vacuum chamber, a vacuum actuated valve in the second chamber, and vacuum actuated means controlling the relative vacuums in the second and third chambers and an associated valve in the second chamber.

7. In an oiling system, three chambers, one of said chambers having passages communicating with the other two chambers and with a fluid supply having a negative pressure head maintained at constant level, and vacuum actuated means in said one chamber coincidently controlling passage of fluid by restriction of the fluid passage, and controlling the vacuum acting to lift the oil by admitting air from another of said chambers having a supply of air restrictedly admitted thereto, said vacuum actuated means being actuated by vacuum existent in the other of said chambers.

8. In an oiling system, three chambers, one of said chambers having passages communicating with the other two chambers and with a fluid supply having a negative pressure head maintained at constant level, and vacuum actuated means in said one chamber coincidently controlling passage of fluid by restriction of the fluid passage, and controlling the vacuum acting to lift the oil by admitting air from another of said chambers having a supply of air restrictedly admitted thereto, said vacuum actuated means being actuated by vacuum existent in the other of said chambers, and normally inoperative means resiliently restraining said vacuum actuated means only when predetermined high vacuum conditions are existent in said other chamber.

DAVID W. EVERETT.